United States Patent
Lv et al.

(10) Patent No.: US 10,727,896 B2
(45) Date of Patent: Jul. 28, 2020

(54) TOWER TOP DEVICE AND PASSIVE INTERMODULATION CANCELLATION METHOD

(71) Applicant: Huawei Technologies Co., Ltd., Shenzhen, Guangdong, P.R. (CN)

(72) Inventors: Jia Lv, Shanghai (CN); Lei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/397,628

(22) Filed: Apr. 29, 2019

(65) Prior Publication Data
US 2019/0253098 A1  Aug. 15, 2019

Related U.S. Application Data

(63) Continuation of application No. PCT/CN2016/104124, filed on Oct. 31, 2016.

(51) Int. Cl.
*H04B 1/525* (2015.01)
*H04B 1/12* (2006.01)
(Continued)

(52) U.S. Cl.
CPC .......... *H04B 1/525* (2013.01); *H04B 1/0475* (2013.01); *H04B 1/109* (2013.01); *H04B 1/1018* (2013.01);
(Continued)

(58) Field of Classification Search
CPC ........ H04B 1/525; H04B 1/109; H04B 1/123; H04B 1/0475; H04B 1/1018; H04B 17/345
(Continued)

(56) References Cited

U.S. PATENT DOCUMENTS 8,521,117 B1   8/2013 Gupta et al.
8,855,175 B2   10/2014 Wyville et al.
(Continued)

FOREIGN PATENT DOCUMENTS

CN   104283580 A   1/2015
CN   104716972 A   6/2015
(Continued)

OTHER PUBLICATIONS

Henrie, Justin et al, "Cancellation of Passive Intermodulation Distortion in Microwave Networks," Proceedings of the 38th European Microwave Conference, Oct. 27, 2008, IEEE, Piscataway, NJ, USA, 4 pages.

*Primary Examiner* — Lee Nguyen
(74) *Attorney, Agent, or Firm* — Slater Matsil, LLP

(57) ABSTRACT

A tower top device and a passive intermodulation cancellation method are provided. The tower top device is connected between an antenna and a radio remote unit (RRU) to perform passive intermodulation (PIM) cancellation. The tower top device includes: a model processing circuit configured to generate a cancellation signal based on an input digital transmit signal and a non-linear model, where the non-linear model is used to represent a non-linear relationship between a source signal generating PIM interference and a PIM interference signal; and a cancellation circuit connected to the model processing circuit and configured to: obtain the cancellation signal generated by the model processing circuit, and perform, based on the cancellation signal, PIM cancellation on a digital received signal including an actual PIM interference signal.

19 Claims, 8 Drawing Sheets

(51) Int. Cl.
*H04W 88/08* (2009.01)
*H04B 17/345* (2015.01)
*H04B 1/04* (2006.01)
*H04B 1/10* (2006.01)

(52) U.S. Cl.
CPC ........... *H04B 1/123* (2013.01); *H04B 17/345* (2015.01); *H04W 88/085* (2013.01)

(58) Field of Classification Search
USPC ..................................................... 455/67.11
See application file for complete search history.

(56) References Cited

U.S. PATENT DOCUMENTS

| | | | |
|---|---|---|---|
| 2003/0232600 A1* | 12/2003 | Montgomery | ......... H01Q 1/246 |
| | | | 455/67.11 |
| 2014/0036736 A1 | 2/2014 | Wyville et al. | |
| 2015/0171902 A1 | 6/2015 | Fleischer et al. | |
| 2015/0244414 A1 | 8/2015 | Yu et al. | |
| 2016/0006468 A1 | 1/2016 | Gale et al. | |
| 2017/0201277 A1 | 7/2017 | Wang et al. | |
| 2018/0070254 A1* | 3/2018 | Hannan | ............... H04B 17/0085 |

FOREIGN PATENT DOCUMENTS

| | | |
|---|---|---|
| CN | 104883197 A | 9/2015 |
| CN | 105264781 A | 1/2016 |
| WO | 2014085345 A1 | 6/2014 |

\* cited by examiner

TOWER TOP DEVICE AND PASSIVE INTERMODULATION CANCELLATION METHOD

CROSS-REFERENCE TO RELATED APPLICATIONS

This application is a continuation of International Application No. PCT/CN2016/104124 filed on Oct. 31, 2016, which is hereby incorporated by reference in its entirety.

TECHNICAL FIELD

This application relates to the field of communications technologies, and in particular, to a tower top device and a passive intermodulation cancellation method.

BACKGROUND

In a mobile communications network, when carrier signals of a plurality of frequencies pass through some passive components, a passive intermodulation (PIM) signal is generated. So-called passive intermodulation means that a plurality of carrier signals of different frequencies are intermodulated due to a frequency mixing effect when they pass through a passive component of a system, and as a result, additional interference is caused to the system. For a mobile communications system, passive components include a duplexer, a feeder cable, a tower-mounted amplifier, an arrester, an antenna, and the like. Because a passive component has an unreliable mechanical connection and a stained contact surface, uses a material with a hysteresis characteristic, and the like, non-linear frequency mixing occurs at a material joint for signals of different frequencies, and PIM interference signals of different amplitudes are generated. A PIM interference signal within a receive frequency band of a base station receiver is received by the base station receiver and causes interference to a received signal of the receiver. As a result, a signal-to-noise ratio of the received signal is decreased, thereby reducing a capacity of the communications system and decreasing network quality. Therefore, a PIM product needs to be suppressed or cancelled.

To reduce impact of the PIM product on the received signal, a PIM cancellation technology is usually used in a baseband unit (BBU), in a remote radio unit (RRU), or in a transit device between a BBU and an RRU, to improve quality of the received signal.

In an existing PIM cancellation technology, during PIM cancellation, non-linear modeling is performed on a transmit signal and a PIM interference signal to obtain a cancellation signal used to cancel the PIM interference signal, and the cancellation signal is superposed on a receive channel of a BBU in a reverse-phase manner, to cancel PIM generated by the transmit signal.

However, when PIM cancellation is performed in a BBU, a cancellation signal is obtained by performing modeling based on a baseband signal to be sent by the BBU to an RRU, and the signal is further processed by functional units such as a multi-carrier combiner, a crest factor reduction (CFR) unit, a digital pre-distortion (DPD) unit, and a duplexer in the RRU. As a result, a transmit signal finally output by the RRU cannot be precisely restored on a BBU side, and modeling precision is low. The cancellation signal obtained after modeling performed by the BBU cannot completely cancel an actual PIM interference signal. As a result, interference still exists in a received signal on an uplink. In addition, in a multi-carrier scenario, implementation is complex and many resources are consumed.

When PIM cancellation is performed in an RRU, each RRU can obtain only a PIM interference signal generated by a transmit signal on a transmit channel of the RRU. Therefore, PIM cancellation between a plurality of RRUs cannot be implemented.

When PIM cancellation is performed in a transit device between a BBU and an RRU, if two different RRUs connected to a same BBU are provided by different device manufacturers, interfaces between the BBU and the RRUs are different; to be specific, transit devices are different. Therefore, PIM cancellation cannot be performed in the transit devices. In addition, in a multi-carrier scenario, implementation is complex and many resources are consumed.

In conclusion, in a wireless communications system, a problem that PIM interference affects receiving performance of a communications device exists, and problems exist in the existing PIM cancellation technology, for example, the modeling precision is low, many resources are consumed, and an application scenario is limited.

SUMMARY

Embodiments of this application provide a tower top device and a passive intermodulation cancellation method, to provide a PIM cancellation solution, so as to reduce interference of PIM to a received signal on an uplink, thereby improving quality of the received signal.

According to a first aspect, a tower top device is provided. The tower top device has a PIM cancellation function, is disposed in an antenna feeder system, and is close to a PIM source. In this way, during PIM cancellation, a transmit signal most similar to a signal generating PIM interference can be used for modeling of a cancellation signal, to better restore a real PIM interference signal and obtain a better PIM cancellation effect.

In a possible implementation, the tower top device is connected between an antenna and at least one RRU, and is configured to perform PIM cancellation. The tower top device includes: a model processing circuit, configured to receive a digital transmit signal and generate a cancellation signal based on the digital transmit signal and a non-linear model, where the non-linear model is used to represent a non-linear relationship between a source signal generating PIM interference and a PIM interference signal, and the digital transmit signal is generated based on a radio frequency signal sent by the at least one RRU to the antenna; and a cancellation circuit, connected to the model processing circuit, and configured to obtain the cancellation signal generated by the model processing circuit and a digital received signal, and perform PIM cancellation on the digital received signal based on the cancellation signal, where the digital received signal is generated based on an analog received signal received by the antenna. In this way, the cancellation signal is calculated based on a transmit signal obtained through combination by a lower-level device, so that the used transmit signal is more similar to a real signal generating PIM interference. In addition, PIM cancellation is performed on a signal received from the antenna, so that distortion caused by another processing process is avoided, a PIM cancellation effect is better, and no additional PIM distortion is introduced.

In a possible design, the tower top device further includes: a first analog-to-digital converter, connected to the model processing circuit, and configured to: receive an analog radio frequency signal from the at least one RRU, and perform analog-to-digital conversion on the analog radio frequency signal, to generate the digital transmit signal; and a second analog-to-digital converter, connected to the cancellation circuit, and configured to: receive the analog received signal from the antenna, and perform analog-to-digital conversion on the analog received signal, to generate the digital received signal.

In a possible design, the tower top device further includes: a coupler, connected between the at least one RRU and the first analog-to-digital converter, and configured to: couple the radio frequency signal from the at least one RRU to generate the analog radio frequency signal, and transmit the analog radio frequency signal to the first analog-to-digital converter.

In a possible design, the tower top device is further configured to: transmit a digital received signal obtained after PIM cancellation to the at least one RRU; or transmit a digital received signal obtained after PIM cancellation to a connection interface between a baseband unit (BBU) and the at least one remote radio unit (RRU). In this way, a digital-to-analog conversion circuit is removed from the tower top device, so that a structure of the tower top device is simpler. In addition, a receiver circuit in an RRU may be replaced by adding other processing performed in the receiver circuit. Therefore, PIM between the RRU and the tower top device does not affect an entire system. The tower top device may transmit the digital received signal on which PIM cancellation is performed to the at least one RRU, and transparently transmit the digital received signal to the BBU by using the RRU; or may directly transmit the digital received signal to the connection interface between the BBU and the RRU by bypassing the RRU, so as to transmit the digital signal to the BBU.

In a possible design, the tower top device further includes: a digital-to-analog converter, connected between the at least one RRU and the cancellation circuit; the cancellation circuit is further configured to transmit a digital received signal obtained after PIM cancellation to the digital-to-analog converter; the digital-to-analog converter is configured to perform digital-to-analog conversion on the digital received signal that is obtained after PIM cancellation and that is from the cancellation circuit, to generate an analog received signal obtained after PIM cancellation; and the tower top device is further configured to transmit the analog received signal obtained after PIM cancellation to the at least one RRU. In this way, the tower top device can be compatible with an existing interface between network elements and can be applied to more scenarios, so that the tower top device has better compatibility.

In a possible design, the tower top device further includes a first amplifier. The first amplifier is connected between the antenna and the cancellation circuit, and is configured to: before the cancellation circuit performs PIM cancellation, perform first signal-amplification on the analog received signal from the antenna. In this way, an output signal obtained after PIM cancellation has been provided with a given gain by the first amplifier, and then is output to a lower-level device. Therefore, a large enough signal-to-noise ratio can be provided for the output signal, thereby ignoring PIM interference generated by the lower-level device.

In a possible design, the tower top device further includes a second amplifier. The second amplifier is connected between the at least one RRU and the digital-to-analog converter, and is configured to perform second signal-amplification on the analog received signal obtained after PIM cancellation; and the transmitting the analog received signal obtained after PIM cancellation to the at least one RRU includes: performing second signal-amplification on the analog received signal obtained after PIM cancellation, and then transmitting a processed analog received signal to the at least one RRU. The analog received signal on which PIM cancellation is performed is provided with a given gain through second signal-amplification, and then is output to a lower-level device. Therefore, a large enough signal-to-noise ratio can be provided for the analog received signal, thereby ignoring PIM interference generated by the lower-level device.

According to a second aspect, a passive intermodulation (PIM) cancellation method is provided. The method is applied to a tower top device connected between an antenna and at least one RRU. The method includes: generating, by the tower top device, a cancellation signal based on a digital transmit signal and a non-linear model, where the non-linear model is used to represent a non-linear relationship between a source signal generating PIM interference and a PIM interference signal, and the digital transmit signal is generated based on a radio frequency signal sent by the at least one RRU to the antenna; and performing, by the tower top device based on the cancellation signal, PIM cancellation on a digital received signal, where the digital received signal is generated based on an analog received signal received by the antenna. In this way, the cancellation signal is calculated based on a transmit signal obtained through combination by a lower-level device, so that the used transmit signal is more similar to a real signal generating PIM interference, a PIM cancellation effect is better, and no additional PIM distortion is introduced.

In a possible design, before generating the cancellation signal based on the digital transmit signal and the non-linear model, the tower top device performs analog-to-digital conversion on an analog radio frequency signal received from the at least one remote radio unit (RRU), to generate the digital transmit signal; and before performing, based on the cancellation signal, PIM cancellation on the digital received signal, the tower top device performs analog-to-digital conversion on the analog received signal received from the antenna, to generate the digital received signal.

In a possible design, the analog radio frequency signal is generated by the tower top device by coupling the radio frequency signal from the at least one RRU.

In a possible design, after PIM cancellation is performed, digital-to-analog conversion is performed on a digital received signal obtained after PIM cancellation, to generate an analog received signal obtained after PIM cancellation, and the analog received signal obtained after PIM cancellation is sent to the at least one RRU; or a digital received signal obtained after PIM cancellation is transmitted to the at least one RRU or a connection interface between a baseband unit (BBU) and the at least one RRU.

In a possible design, the method further includes: before performing PIM cancellation, performing, by the tower top device, first signal-amplification on the analog received signal from the antenna. In this way, an output signal obtained after PIM cancellation has been provided with a given gain through first signal-amplification, and then is output to a lower-level device. Therefore, a large enough signal-to-noise ratio can be provided for the output signal, thereby ignoring PIM interference generated by the lower-level device.

In a possible design, the sending the analog received signal obtained after PIM cancellation to the at least one RRU includes: performing second signal-amplification on the analog received signal obtained after PIM cancellation, and then sending a processed analog received signal to the at least one RRU. The analog received signal on which PIM cancellation is performed is provided with a given gain through second signal-amplification, and then is output to a lower-level device. Therefore, a large enough signal-to-noise ratio can be provided for the analog received signal, thereby ignoring PIM interference generated by the lower-level device.

According to a third aspect, a PIM cancellation system is provided, including a BBU, an RRU, the tower top device according to any one of the first aspect or the possible designs of the first aspect, and an antenna.

The tower top device and the PIM cancellation method are applied between the antenna and the RRU, to be specific, applied to a place close to a PIM source. The cancellation signal is calculated based on a transmit signal output by the RRU, so that the used transmit signal is more similar to a real signal generating PIM interference, a PIM cancellation effect is better, and no additional PIM distortion is introduced. In addition, the tower top device and the PIM cancellation method use a signal obtained through combination by one or more RRUs, to perform PIM cancellation, so that PIM cancellation between a plurality of RRUs can be supported. In addition, in the antenna feeder system, a broadband signal may be used for non-linear modeling. This avoids making system processing more complex due to an increase in a quantity of carriers supported by the RRU, thereby saving resources.

DETAILED DESCRIPTION

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

The embodiments of this application may be applied to a Long Term Evolution (LTE) system and a subsequent evolved system such as a 5G (the 5$^{th}$ generation mobile communications) system, and a wireless communications system such as a Universal Mobile Telecommunications System (UMTS) or a Global System for Mobile Communications (GSM), and may also be applied to another communications system in which PIM cancellation is needed.

A network device to which the solution provided in the embodiments of this application is applied is usually a base station in the wireless communications system, or may be another device or apparatus for which PIM cancellation needs to be implemented. The base station may include macro base stations, micro base stations, repeater stations, access points, RRUs, or the like in various forms. In different systems, a device having a base station function may have different names, for example, is referred to as an evolved NodeB (eNB or eNodeB) in an LTE network, or a NodeB in a 3G (the 3rd generation) network.

Figure 1:
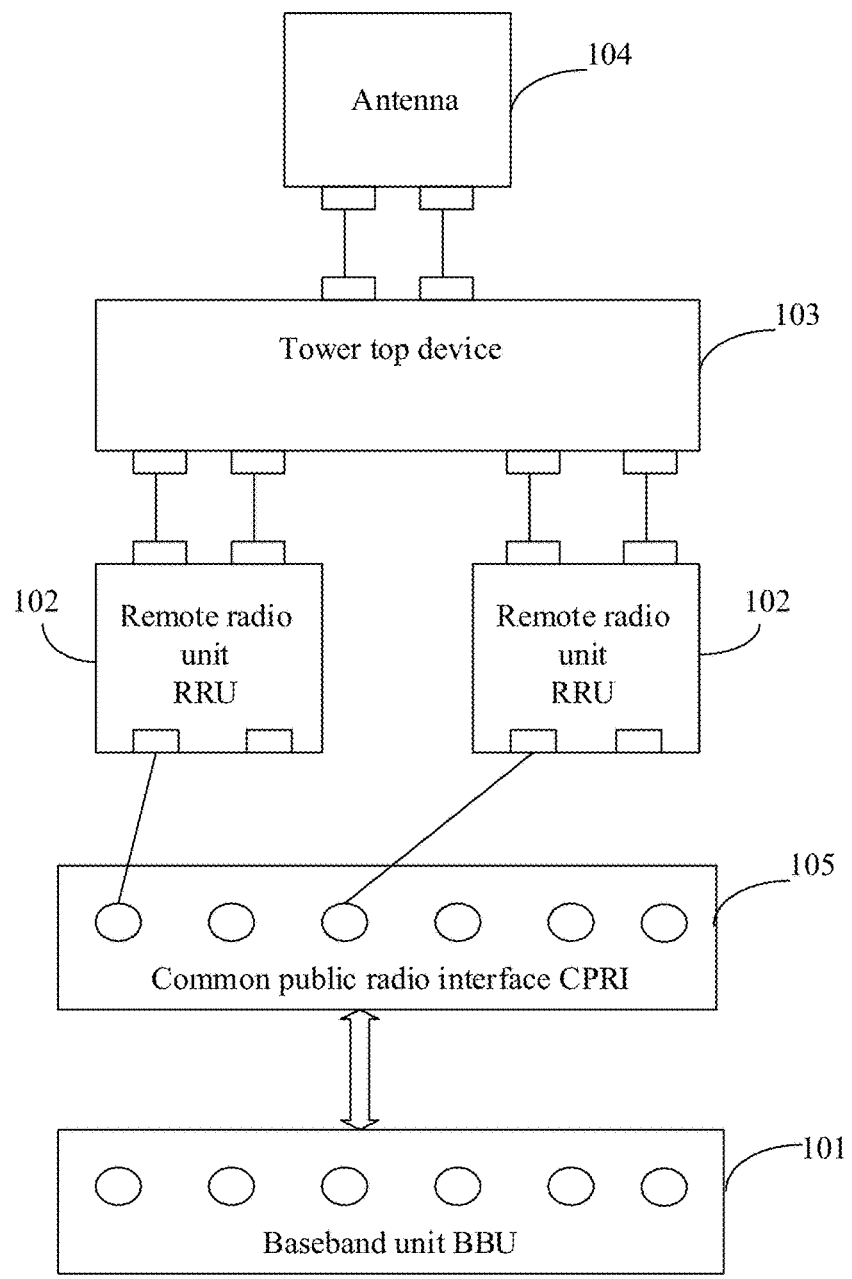
FIG. 1 is a schematic diagram of an applied system architecture according to an embodiment of this application.

As shown in FIG. 1, a system architecture applied to the embodiments of this application includes a BBU 101, at least one RRU 102 connected to the BBU 101, a tower top device 103, and an antenna 104. Certainly, more BBUs 101 and RRUs 102 connected to the BBUs 101 may be included. This is not limited in this application. In the system architecture shown in FIG. 1, an example in which one BBU 101 and two RRUs 102 are included is used. FIG. 1 is a schematic diagram of a connection between the BBU 101 and the RRUs 102. In FIG. 1, the one BBU 101 and the two RRUs 102 are connected by using a common public radio interface (CPRI) 105. Certainly, the RRUs and the BBU may alternatively be connected by using another type of interface. This is not limited herein.

Figure 2:
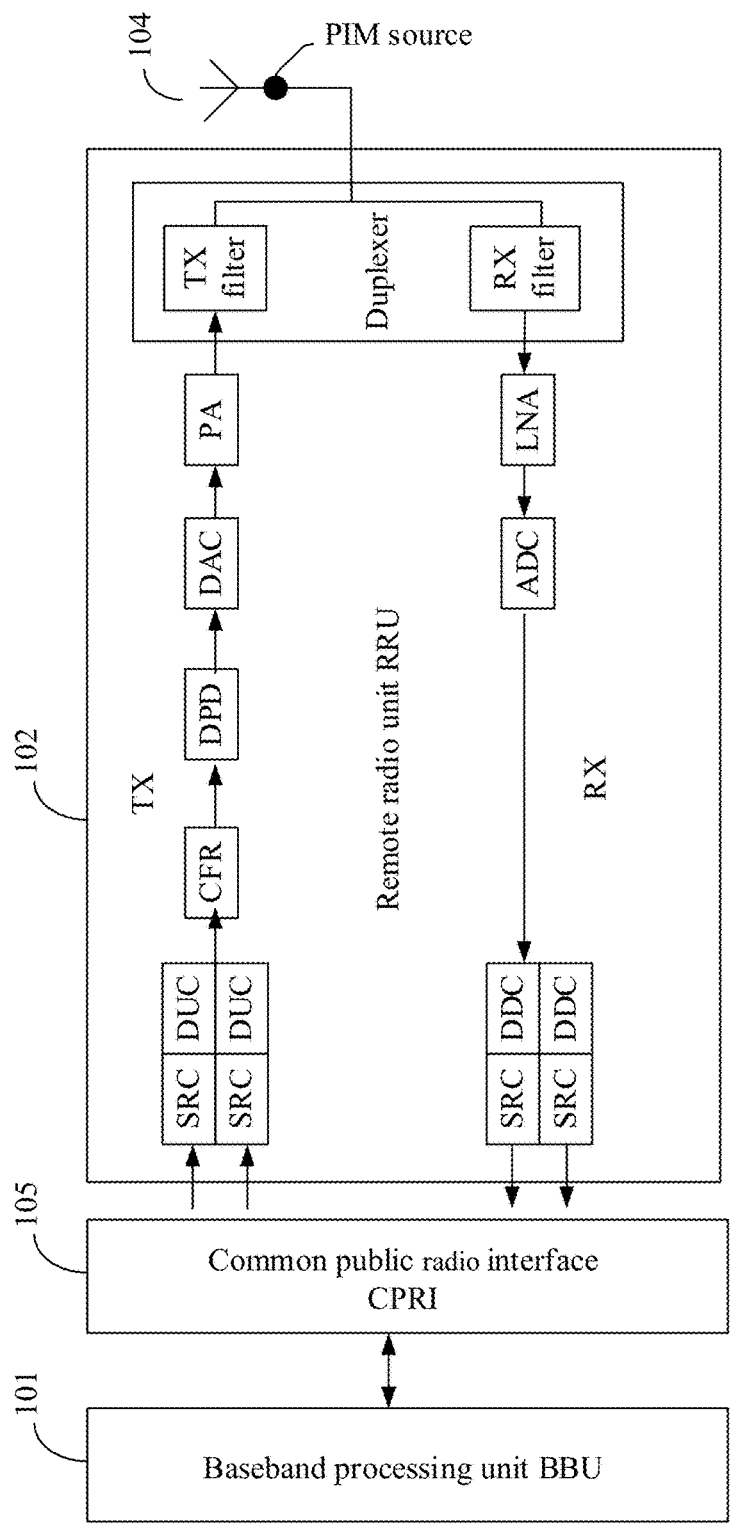
FIG. 2 is a flowchart of a signal processing process in an RRU according to an embodiment of this application.

The following describes in detail a signal processing process in the RRU 102 with reference to FIG. 2.

Usually, one RRU 102 includes at least one transmit channel and at least one receive channel. The transmit channel is a channel used for transmitting a wireless signal and processing the to-be-sent wireless signal in the RRU 102. The receive channel is a channel used for receiving a wireless signal and processing the received wireless signal in the RRU 102.

As shown in FIG. 2, the signal processing process in the RRU 102 is described as follows.

Based on a signal transmission direction, in a direction of transmission from left to right, a transmit signal is transmitted, an entire transmit link is represented by TX and is a downlink, and a corresponding channel through which the transmit signal passes is a transmit channel; in a direction of transmission from right to left, a received signal is transmitted, an entire receive link is represented by RX and is an uplink, and a corresponding channel through which the received signal passes is a receive channel.

For the downlink:

The RRU 102 receives a baseband signal from the BBU 101 through the CPRI 105. The baseband signal is upsampled by using a sample rate converter (SRC), and a transmit signal is obtained after an upsampled baseband signal passes through a digital up converter (DUC). Then, the RRU 102 performs a series of processing on the transmit signal.

CFR processing is performed on the transmit signal. A peak value of a signal obtained after CFR processing is compressed. A compressed signal varies with a used CFR processing scheme.

The RRU 102 further performs DPD processing on the signal obtained after CFR processing. During DPD processing, characteristics such as an amplitude and a phase of the signal are dynamically adjusted to reduce distortion of the transmit signal.

The RRU 102 further converts a signal obtained after DPD processing into an analog transmit signal by using a digital-to-analog converter (DAC), up converts the analog transmit signal to a radio frequency through radio frequency processing, amplifies the analog transmit signal through a power amplifier (PA), and sends, after the analog transmit signal is processed by a TX filter, a processed analog transmit signal by using the antenna 104.

For the uplink:

On a receive channel of the RRU 102, after being processed by an RX filter, a received signal received by using the antenna 104 is sent to an SRC after undergoing signal amplification by a low noise amplifier (LNA), analog-to-digital conversion by an analog-to-digital converter (ADC), and processing by a digital down converter (DDC), for downsampling. An obtained baseband received signal is sent to the BBU 101 through the CPRI 105.

It should be noted that some components non-critical for the embodiments of this application are not shown in FIG. 2. The signal processing process and an internal structure of the RRU shown in FIG. 2 are merely an example to help understanding and are not intended to limit this application. In an actual network, an internal structure and a signal processing process of an RRU may be designed in another manner, and details are not described herein.

As shown in FIG. 2, usually, a passive component in an antenna feeder system generates a PIM interference signal. To be specific, most PIM sources are located in a position shown in FIG. 2. In an existing system, an external antenna feeder device is disposed between a PIM source and the RRU 102, and is not shown in FIG. 2. The external antenna feeder device includes a tower-mounted amplifier, a combiner, a filter, and the like. As described in the prior art, in an existing PIM cancellation technology, during PIM cancellation, when a transmit signal used to calculate a cancellation signal is obtained in a BBU or in a transit device (for example, a CPRI) between a BBU and an RRU, because results of a series of processing processes performed on the transmit signal on a transmit channel cannot be known, it is difficult to restore, by using the cancellation signal calculated through modeling, a real signal generating PIM interference. Consequently, PIM cancellation cannot be completely performed. Therefore, during PIM cancellation, when the transmit signal used to calculate the cancellation signal is closer to the PIM source, a PIM cancellation effect is better.

A tower top device is designed in an embodiment of this application. The tower top device is disposed between an RRU and an antenna, and is close to the antenna 104, to be specific, disposed in a place close to a PIM source. A cancellation signal is calculated based on a transmit signal output by the RRU 102, so that the used transmit signal is more similar to a real signal generating PIM interference, a PIM cancellation effect is better, and no additional PIM distortion is introduced.

Certainly, in addition to the position of the PIM source shown in FIG. 2, a lower-level device (such as the RRU 102, the BBU 101, and the CPRI 105) may also generate PIM interference.

The tower top device provided in this embodiment of this application may be disposed in a position represented by the tower top device 103 in FIG. 1. In addition to including a structure provided in this embodiment of this application, the tower top device 103 may further include but is not limited to a tower-mounted amplification device. Optionally, the tower top device 103 may further include a function similar to the external antenna feeder device between the PIM source and the RRU 102 in the prior art, to replace the external antenna feeder device in the system.

With reference to the accompanying drawings, the following describes in detail a tower top device and a PIM cancellation method provided in the embodiments of this application.

Figure 3:
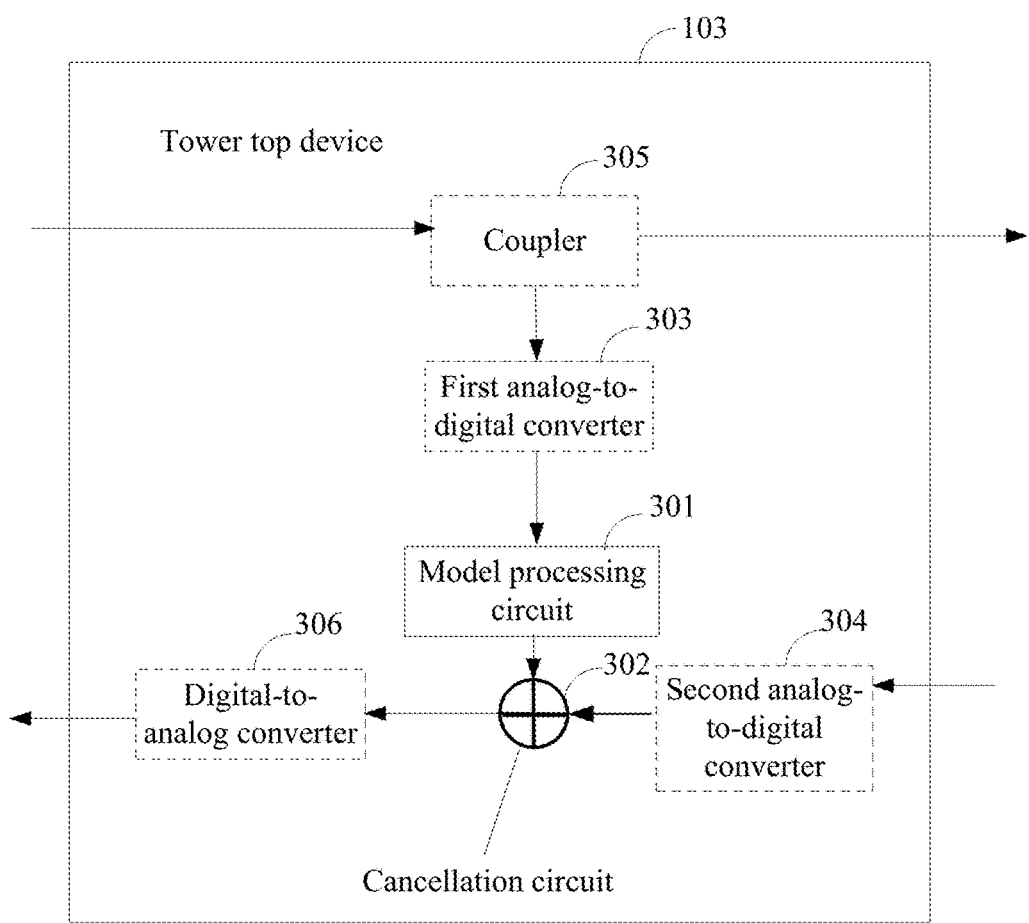
FIG. 3 is a schematic structural diagram of a tower top device according to an embodiment of this application.

As shown in FIG. 3, a tower top device 103 provided in an embodiment of this application includes a model processing circuit 301 and a cancellation circuit 302. Optionally, the tower top device 103 further includes a first analog-to-digital converter 303, a second analog-to-digital converter 304, and a coupler 305; and optionally, may further include a digital-to-analog converter 306. FIG. 3 shows a connection relationship between the components. It can be understood that the connection relationship between the components shown in FIG. 3 is merely a possible example and is not intended to limit a structure of the tower top device 103 in this application.

The coupler 305 couples at least one signal from a lower-level device, for example, couples a radio frequency signal sent by at least one RRU to an antenna, to generate an analog radio frequency signal, and transmits the analog radio frequency signal to the first analog-to-digital converter 303. The coupler 305 is one broadband coupler or a plurality of narrowband couplers. If the coupler 305 is a plurality of narrowband couplers, a plurality of first analog-to-digital converters 303 may be correspondingly configured.

The first analog-to-digital converter 303 performs analog-to-digital conversion on the analog radio frequency signal to generate a digital transmit signal, and transmits the digital transmit signal to the model processing circuit 301.

Certainly, the model processing circuit 301 may alternatively obtain the digital transmit signal in another manner by using a corresponding component. This is not limited in this application.

The model processing circuit 301 generates a cancellation signal based on the digital transmit signal input by the first analog-to-digital converter 303 and a non-linear model. The model processing circuit 301 may be a digital filter, and may perform non-linear modeling for representing a non-linear relationship between two or more signals. The non-linear model herein is used to represent a non-linear relationship between a source signal generating PIM interference and a PIM interference signal. Optionally, the model processing circuit 301 is an adaptive digital filter, and may fast refresh the non-linear model based on changes of the source signal generating PIM interference and the PIM interference signal. The model processing circuit 301 may estimate, based on the non-linear model, a PIM interference signal generated by the input digital transmit signal. The estimated PIM interference signal is an estimated value. In an ideal case, the estimated value and an actual PIM interference signal have an equal amplitude and a same phase, or have an equal amplitude and inverted phases. The estimated PIM interference signal is used to cancel PIM interference of a received signal, and therefore may be referred to as the cancellation signal herein.

The model processing circuit 301 transmits the cancellation signal to the cancellation circuit 302.

In a receiving direction, the second analog-to-digital converter 304 performs analog-to-digital conversion on an analog received signal received from the antenna, to generate a digital received signal. The digital received signal includes an actual PIM interference signal. The second analog-to-digital converter 304 transmits the digital received signal to the cancellation circuit 302.

The cancellation circuit 302 obtains a cancellation signal generated by the model processing circuit 301 and receives the digital received signal transmitted by the second analog-to-digital converter 304, and performs, based on the cancellation signal, PIM cancellation on the digital received signal including the actual PIM interference signal. When the cancellation signal and the actual PIM interference signal have an equal amplitude and a same phase, the cancellation circuit 302 combines the cancellation signal and the digital received signal including the actual PIM interference signal, in other words, performs subtraction. When the cancellation signal and the actual PIM interference signal have an equal amplitude and inverted phases, the cancellation circuit 302 performs addition on the cancellation signal and the digital received signal including the actual PIM interference signal.

Certainly, the cancellation circuit 302 may alternatively receive the digital received signal in another manner by using a corresponding component. This is not limited in this application.

After the cancellation circuit 302 performs PIM cancellation, two optional output manners are available:

In a first manner, the cancellation circuit 302 transmits a digital received signal obtained after PIM cancellation to a connection interface between a BBU 101 and the at least one RRU 102. Optionally, a digital received signal obtained after PIM cancellation may alternatively be processed by a DDC and an SRC. The processing performed by the DDC and the processing performed by the SRC may be implemented by designing corresponding functional modules in the tower top device 103, or may be implemented by corresponding functional modules in a device located between the RRU 102 and the antenna 104. Optionally, after being processed by the DDC and the SRC, the digital received signal obtained after PIM cancellation may be directly sent to a connection interface between a BBU 101 and the at least one RRU 102; or may be sent to the RRU 102 and then transparently transmitted to a connection interface between a BBU 101 and the at least one RRU 102 by using the RRU 102. In this case, the digital-to-analog converter 306 may not be configured. In this way, the structure of the tower top device 103 is simper. In addition, some processing may be added to replace processing performed by a receiver in the RRU 102, thereby avoiding PIM generated by a component in the RRU 102.

In a second manner, the cancellation circuit 302 transmits a digital received signal obtained after PIM cancellation to the digital-to-analog converter 306. The digital-to-analog converter 306 performs digital-to-analog conversion on the digital received signal that is obtained after PIM cancellation and that is from the cancellation circuit 302, to generate an analog received signal, and transmits the generated analog received signal to the at least one RRU.

The model processing circuit 301 and the cancellation circuit 302 each may include a hardware chip, or the model processing circuit 301 and the cancellation circuit 302 may be combined on a same hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The model processing circuit 301 and the cancellation circuit 302 each may alternatively include a chip system, or the model processing circuit 301 and the cancellation circuit 302 may be combined in a chip system. The chip system includes the foregoing hardware chip and another discrete component.

The following describes an internal structure and a signal processing process of the tower top device 103 with reference to architectures and signal processing processes of various components in the system shown in FIG. 2.

FIG. 4A, FIG. 4B, FIG. 5A, and FIG. 5B show the internal structure of the tower top device 103 and two different signal processing processes.

As shown in FIG. 4A and FIG. 4B or FIG. 5A and FIG. 5B, based on the tower top device 103 shown in FIG. 3, the tower top device 103 further includes a first amplifier 401. Optionally, the tower top device 103 further includes a second amplifier 402.

Optionally, the first amplifier 401 and the second amplifier 402 may be low noise amplifiers LNA. The first amplifier 401 and the second amplifier 402 each may be implemented by using one level of LNA or a plurality of levels of LNAs. An example in which both the first amplifier 401 and the second amplifier 402 are implemented by using one level of LNA is used in FIG. 4A and FIG. 4B or FIG. 5A and FIG. 5B for schematic description.

In FIG. 4A, FIG. 4B, FIG. 5A, and FIG. 5B, for example, the system includes two RRUs 102 represented by an RRU 0 and an RRU 1. A transmit channel and a receive channel of the RRU 0 are respectively represented by TX 0 and RX 0. A transmit channel and a receive channel of the RRU 1 are respectively represented by TX 1 and RX 1.

Correspondingly, optionally, the tower top device 103 further includes a combined duplexer 403. The combined duplexer 403 includes two TX filters and two RX filters that are represented by a TX filter 0, a TX filter 1, an RX filter 0 and an RX filter 1. Optionally, at a receiving place, the tower top device 103 further includes two RX filters 406 that are represented by an RX filter 0 and an RX filter 1.

Optionally, the tower top device 103 further includes a digital down converter DDC 405 and a sampling rate converter SRC 406.

On a downlink:

Transmit signals of two transmit channels of the RRU 0 and the RRU 1 are respectively processed by two TX filters 403 (namely, the TX filter 0 and the TX filter 1). The TX filters 403 send processed transmit signals to the antenna, and the coupler 305 couples the transmit signals to the first analog-to-digital converter 303 for PIM cancellation.

On an uplink:

Two RX filters 404 perform filtering on a received signal from the antenna 104, and a processed received signal is sent to the first amplifier 401.

The first amplifier 401 performs first signal-amplification on the received signal, and transmits a processed received signal to the second analog-to-digital converter 304 for analog-to-digital conversion. A digital received signal obtained after conversion is transmitted to the cancellation circuit 302 for PIM cancellation.

After a digital received signal obtained after the cancellation circuit 302 performs PIM cancellation is output, two signal processing processes are available according to FIG. 4A, FIG. 4B, FIG. 5A, and FIG. 5B.

Figure 4A:
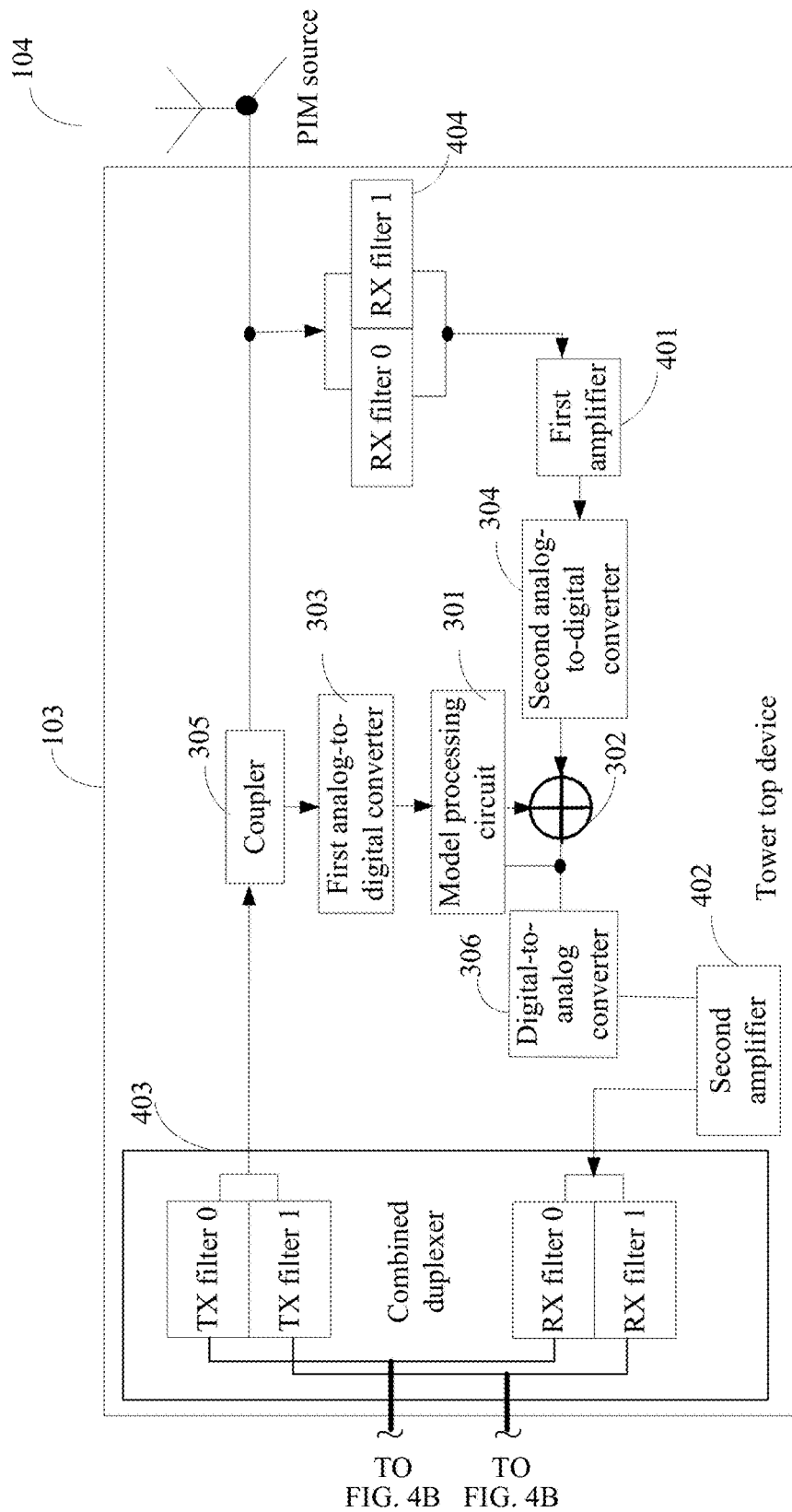
FIG. 4A, FIG. 4B, FIG. 5A, and FIG. 5B are schematic diagrams of internal structures and signal processing processes of another two tower top devices according to an embodiment of this application.
Figure 4B:
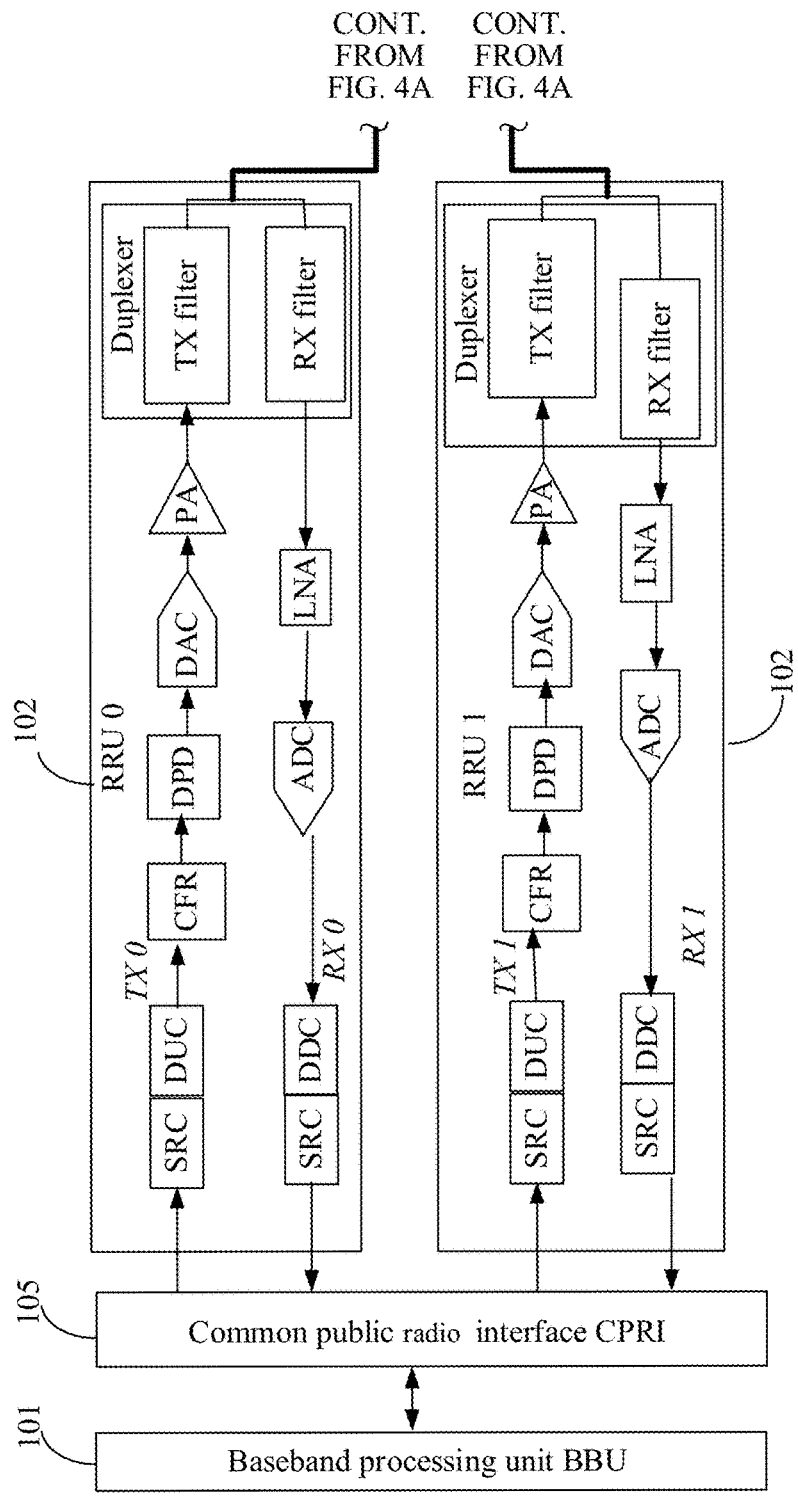

As shown in FIG. 4A and FIG. 4B, the digital-to-analog converter 306 performs digital-to-analog conversion on the digital received signal obtained after PIM cancellation, and transmits an analog received signal obtained after digital-to-analog conversion to the second amplifier 402. The second amplifier 402 performs signal amplification on an analog received signal obtained after PIM cancellation, where the signal amplification is referred to as second signal-amplification. The second amplifier 402 transmits an analog received signal obtained after second signal-amplification to the combined duplexer 403 for processing. The combined duplexer 403 transmits a processed analog received signal to a receiver circuit of the RRU 102. In this way, an enough gain can be provided for the output signal, and a signal-to-noise ratio increases greatly, so that a PIM interference signal of a lower-level device can be ignored. Optionally, the second amplifier 402 may be an automatic gain control (AGC) apparatus. When signal amplification needs to be further performed, the second amplifier 402 amplifies the analog received signal obtained after PIM cancellation.

Figure 5A:
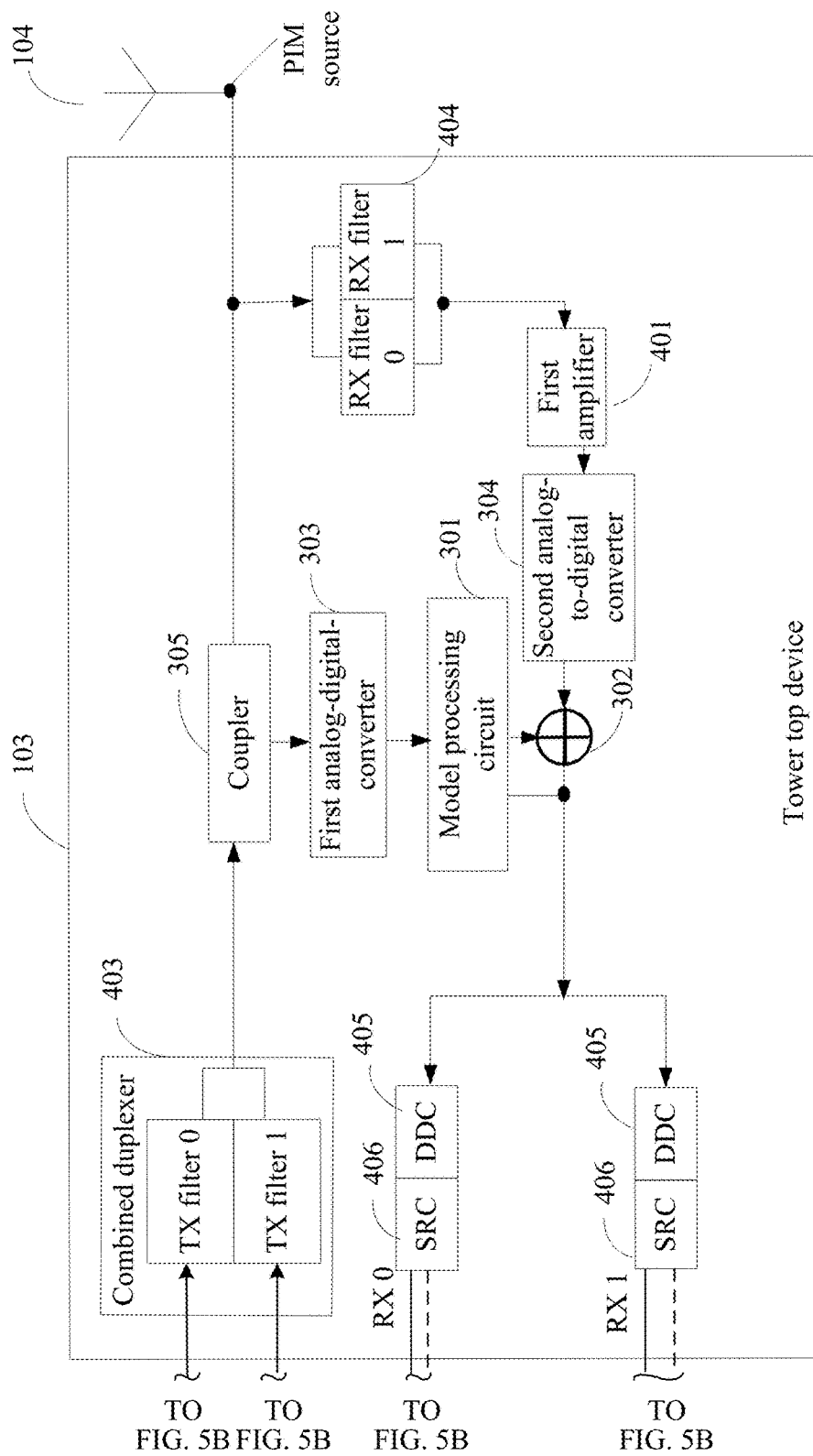
Figure 5B:
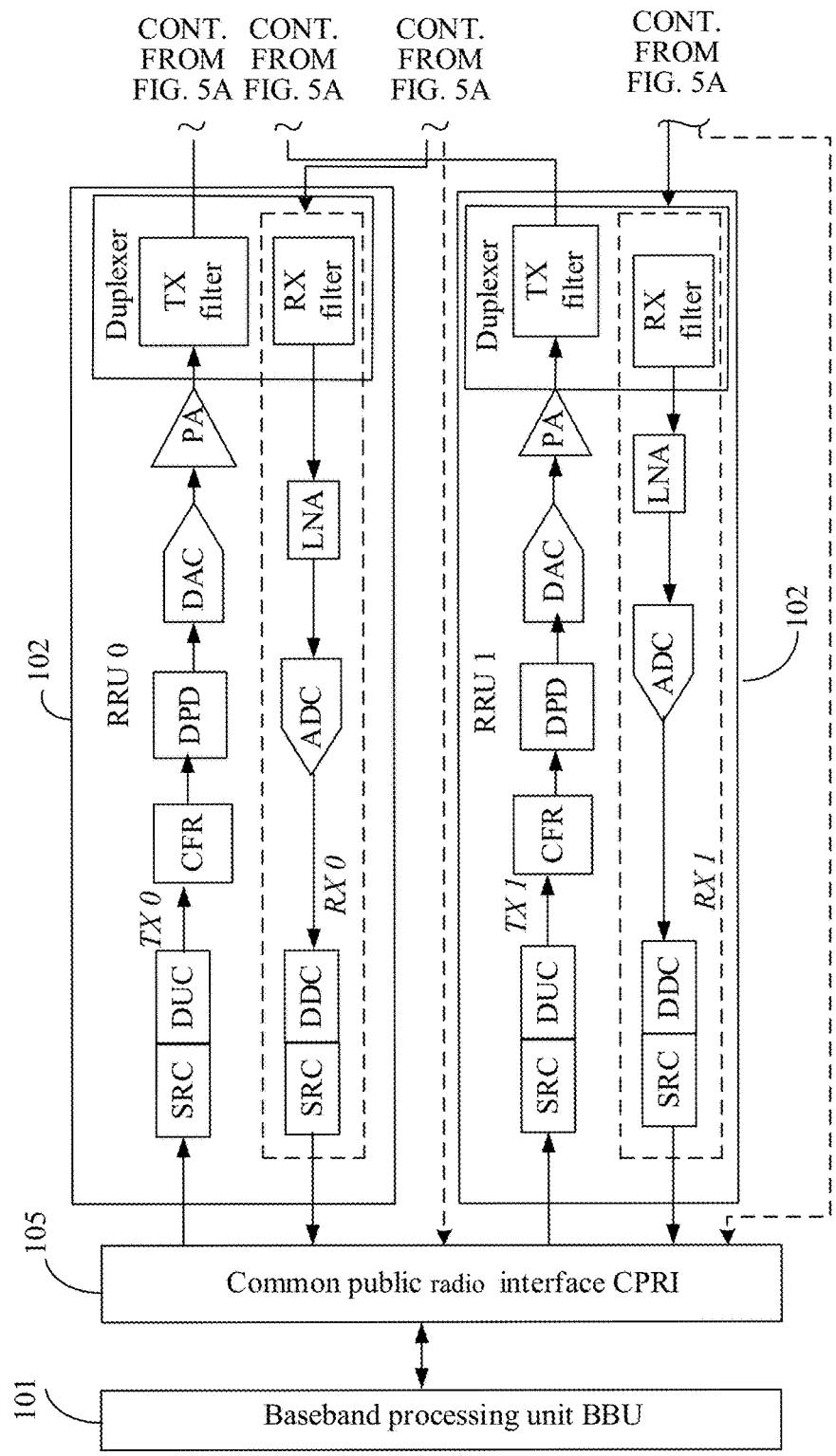

As shown in FIG. 5A and FIG. 5B, the digital-to-analog converter 306 is not configured in the tower top device 103. After performing second signal-amplification, the second amplifier 402 transmits a processed digital received signal to the DDC 405 and the SRC 406 for processing. The SRC 404 directly transmits a processed signal to a connection interface between a BBU 101 and the RRU 102, for example, to a CPRI 105, as shown by a dashed line in FIG. 5A and FIG. 5B. Optionally, the SRC 404 may alternatively transparently transmit a processed signal to a connection interface between a BBU 101 and the RRU 102 by using the RRU 102. Therefore, in a structure shown in FIG. 5A and FIG. 5B, a digital-to-analog conversion circuit is not configured in the tower top device 103, so that the structure is simplified. A receiver circuit (represented by a dashed box in FIG. 5A and FIG. 5B) of the RRU 102 has been completely implemented in the tower top device 103, and the receiver circuit of the RRU 102 is actually bypassed. Therefore, PIM between the RRU 102 and the tower top device 103 does not affect the entire system.

The tower top device 103 in the foregoing embodiment may include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof. The tower top device 103 may alternatively include a chip system. The chip system includes the foregoing hardware chip and another discrete component.

It should be noted that the tower top devices shown in FIG. 3, FIG. 4A, FIG. 4B, FIG. 5A, and FIG. 5B show only key components in the embodiments of this application. A tower top device in an actual network may further include other signal processing processes. This is not limited in this application. For example, with reference to the embodiment shown in FIG. 5A and FIG. 5B, when the tower top device 103 bypasses the receiver circuit of the RRU 102, the tower top device may further include another signal processing process performed in the receiver circuit and a corresponding apparatus, to implement all functions of the receiver circuit of the RRU 102.

In addition, FIG. 3, FIG. 4A, FIG. 4B, FIG. 5A, and FIG. 5B show only the tower top devices that are each used on one receive channel. An antenna feeder system in an actual network may include more receive channels. When more receive channels are included, the tower top device 103 may include PIM cancellation processes and apparatuses that are corresponding to more channels, for example, include more model processing circuits 301, cancellation circuits 302, first amplifiers 401, and second amplifiers 402. This is not limited in this application.

Figure 6:
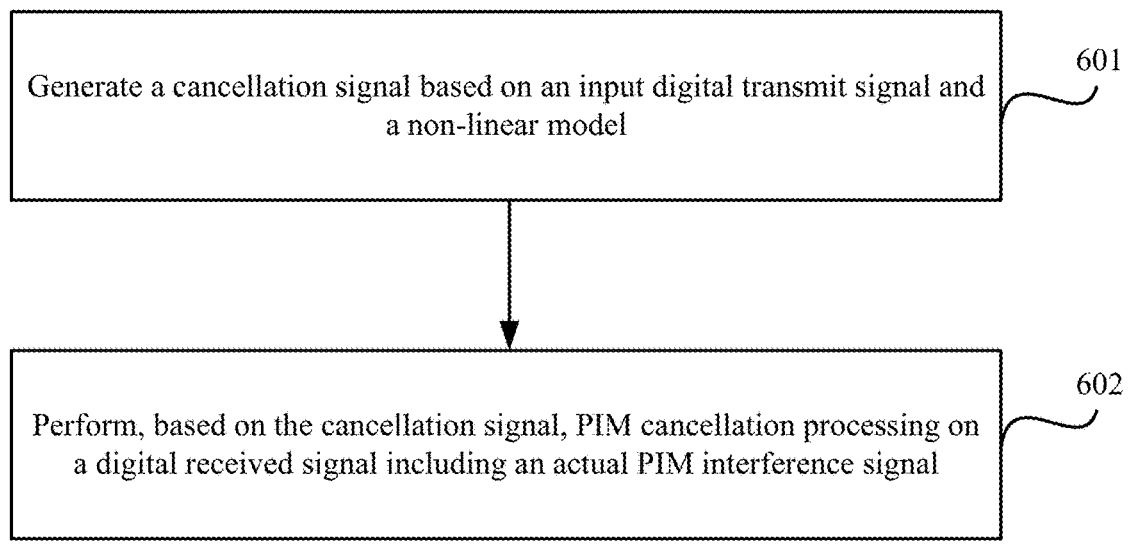
FIG. 6 is a schematic flowchart of a PIM cancellation method according to an embodiment of this application.

With reference to the tower top devices shown in FIG. 3, FIG. 4A, FIG. 4B, FIG. 5A, and FIG. 5B, referring to FIG. 6, based on a same inventive concept, an embodiment of this application provides a passive intermodulation (PIM) cancellation method. The method is applied to a tower top device 103. The method includes the following steps:

601. The tower top device 103 generates a cancellation signal based on an input digital transmit signal and a non-linear model, where the non-linear model is used to represent a non-linear relationship between a source signal generating PIM interference and a PIM interference signal.

602. The tower top device 103 performs, based on the cancellation signal, PIM cancellation on a digital received signal that includes an actual PIM interference signal and that is from an antenna 104.

Optionally, before generating the cancellation signal based on the digital transmit signal and the non-linear model, the tower top device 103 receives an analog radio frequency signal from at least one RRU. The tower top device 103 extracts some analog radio frequency signals for analog-to-digital conversion, to generate the digital transmit signal. Before performing, based on the cancellation signal, PIM cancellation on the digital received signal that includes the actual PIM interference signal and that is from the antenna 104, the tower top device 103 performs analog-to-digital conversion on an analog received signal received from the antenna 104, to generate the digital received signal.

Optionally, after PIM cancellation is performed, digital-to-analog conversion is performed on a digital received signal obtained after PIM cancellation, to generate an analog received signal, and the generated analog received signal is sent to the RRU; or a digital received signal obtained after PIM cancellation is transmitted to the RRU or a connection interface between a baseband unit (BBU) and the RRU.

Optionally, before performing PIM cancellation, the tower top device 103 performs first signal-amplification on a received signal, and sends a received signal obtained after first signal-amplification to a second analog-to-digital converter 304. The received signal includes an analog received signal before analog-to-digital conversion is performed on the digital received signal.

Optionally, after PIM cancellation, the tower top device 103 sends a digital received signal obtained after PIM cancellation to the at least one RRU or a connection interface between a BBU and at least one RRU.

Optionally, after performing PIM cancellation, the tower top device 103 performs digital-to-analog conversion on a digital received signal obtained after PIM cancellation, to generate an analog received signal obtained after PIM cancellation, performs second signal-amplification on the analog received signal obtained after PIM cancellation, and sends an analog received signal obtained after second signal-amplification to the at least one RRU.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A tower top device, comprising:
   a model processing circuit configured to:
      receive a digital transmit signal; and
      generate a cancellation signal based on the digital transmit signal and a non-linear model, wherein the non-linear model represents a non-linear relationship between a source signal generating passive intermodulation (PIM) interference and a PIM interference signal, and the digital transmit signal is generated based on a radio frequency signal sent by at least one remote radio unit (RRU) to an antenna; and
   a cancellation circuit connected to the model processing circuit and configured to:
      obtain a digital received signal and the cancellation signal generated by the model processing circuit; and
      perform PIM cancellation on the digital received signal based on the cancellation signal, wherein the digital received signal is generated based on an analog received signal received by the antenna;
   wherein the tower top device is coupled between the antenna and the at least one RRU.

2. The tower top device according to claim 1, further comprising:
   a first analog-to-digital converter connected to the model processing circuit and configured to:
      receive an analog radio frequency signal from the at least one RRU; and
      perform analog-to-digital conversion on the analog radio frequency signal to generate the digital transmit signal; and
   a second analog-to-digital converter connected to the cancellation circuit and configured to:
      receive the analog received signal from the antenna; and
      perform analog-to-digital conversion on the analog received signal to generate the digital received signal.

3. The tower top device according to claim 2, further comprising:
   a coupler connected between the at least one RRU and the first analog-to-digital converter and configured to:
      couple the radio frequency signal from the at least one RRU to generate the analog radio frequency signal, and
      transmit the analog radio frequency signal to the first analog-to-digital converter.

4. The tower top device according to claim 1, wherein the tower top device is further configured to:
   transmit a digital received signal obtained after PIM cancellation to the at least one RRU; or
   transmit a digital received signal obtained after PIM cancellation to a connection interface between a baseband unit (BBU) and the at least one RRU.

5. The tower top device according to claim 1, further comprising:
   a digital-to-analog converter connected between the at least one RRU and the cancellation circuit;
   wherein the cancellation circuit is further configured to transmit a digital received signal obtained after PIM cancellation to the digital-to-analog converter;
   wherein the digital-to-analog converter is configured to perform digital-to-analog conversion on the digital received signal from the cancellation circuit to generate an analog received signal obtained after PIM cancellation; and
   wherein the tower top device is further configured to: transmit the analog received signal obtained after PIM cancellation to the at least one RRU.

6. The tower top device according to claim 5, further comprising:
   a second amplifier connected between the at least one RRU and the digital-to-analog converter and configured to perform second signal-amplification on the analog received signal obtained after PIM cancellation; and
   wherein to transmit the analog received signal obtained after PIM cancellation to the at least one RRU, the tower top device is configured to: perform second signal-amplification on the analog received signal obtained after PIM cancellation, and then transmit a processed analog received signal to the at least one RRU.

7. The tower top device according to claim 1, further comprising:
   a first amplifier connected between the antenna and the cancellation circuit and configured to: before the cancellation circuit performs PIM cancellation, perform first signal-amplification on the analog received signal from the antenna.

8. The tower top device according to claim 1, wherein the tower top device is further configured to transmit a digital received signal obtained after PIM cancellation to a connection interface between a baseband unit (BBU) and the at least one RRU, bypassing the at least one RRU.

9. The tower top device according to claim 8, wherein:
   the tower top device further comprises a sample rate converter (SRC); and
   the tower top device is further configured to process the digital received signal obtained after PIM cancellation using the SRC prior to transmitting the digital received signal obtained after PIM cancellation to the connection interface such that the digital received signal obtained after PIM cancellation, as transmitted to the connection interface, has been processed using the SRC.

10. The tower top device according to claim 8, wherein:
the tower top device further comprises a digital down converter (DDC); and
the tower top device is further configured to process the digital received signal obtained after PIM cancellation using the digital down converter (DDC) prior to transmitting the digital received signal obtained after PIM cancellation to the connection interface such that the digital received signal obtained after PIM cancellation, as transmitted to the connection interface, has been processed using the DDC.

11. A passive intermodulation (PIM) cancellation method, wherein the method is applied to a tower top device coupled between an antenna and at least one remote radio unit (RRU), the method comprising:
generating, by the tower top device, a cancellation signal based on a digital transmit signal and a non-linear model, wherein the non-linear model represents a non-linear relationship between a source signal generating passive intermodulation (PIM) interference and a PIM interference signal, and the digital transmit signal is generated based on a radio frequency signal sent by the at least one RRU to the antenna; and
performing, by the tower top device based on the cancellation signal, PIM cancellation on a digital received signal, wherein the digital received signal is generated based on an analog received signal received by the antenna.

12. The method according to claim 11, wherein:
before generating a cancellation signal based on a digital transmit signal and a non-linear model, the method further comprises:
performing, by the tower top device, analog-to-digital conversion on an analog radio frequency signal received from the at least one RRU to generate the digital transmit signal; and
before performing, based on the cancellation signal, PIM cancellation on a digital received signal, the method further comprises:
performing, by the tower top device, analog-to-digital conversion on the analog received signal received from the antenna to generate the digital received signal.

13. The method according to claim 9, wherein the analog radio frequency signal is generated by the tower top device by coupling the radio frequency signal from the at least one RRU.

14. The method according to claim 11, wherein after performing PIM cancellation, the method further comprises:
performing digital-to-analog conversion on a digital received signal obtained after PIM cancellation to generate an analog received signal obtained after PIM cancellation, and sending the analog received signal obtained after PIM cancellation to the at least one RRU; or
transmitting a digital received signal obtained after PIM cancellation to the at least one RRU or a connection interface between a baseband unit (BBU) and the at least one RRU.

15. The method according to claim 14, wherein sending the analog received signal obtained after PIM cancellation to the at least one RRU comprises:
performing second signal-amplification on the analog received signal obtained after PIM cancellation, and then sending a processed analog received signal to the at least one RRU.

16. The method according to claim 11, further comprising:
before performing PIM cancellation, performing, by the tower top device, first signal-amplification on the analog received signal from the antenna.

17. The method according to claim 11, further comprising, after performing PIM cancellation, transmitting a digital received signal obtained after PIM cancellation to a connection interface between a baseband unit (BBU) and the at least one RRU, bypassing the at least one RRU.

18. The method according to claim 17, further comprising processing the digital received signal obtained after PIM cancellation using one or more of a sample rate converter (SRC) or a digital down converter (DDC) prior to transmitting the digital received signal obtained after PIM cancellation to the connection interface such that the digital received signal obtained after PIM cancellation, as transmitted to the connection interface, has been processed using one or more of the SRC or the DDC.

19. A system, comprising:
an antenna;
a remote radio unit (RRU); and
a tower top device coupled between the antenna and the RRU and configured to perform passive intermodulation (PIM) cancellation, the tower top device comprising:
a model processing circuit configured to:
receive a digital transmit signal; and
generate a cancellation signal based on the digital transmit signal and a non-linear model, wherein the non-linear model represents a non-linear relationship between a source signal generating PIM interference and a PIM interference signal, and the digital transmit signal is generated based on a radio frequency signal sent by the RRU to the antenna; and
a cancellation circuit connected to the model processing circuit and configured to:
obtain a digital received signal and the cancellation signal generated by the model processing circuit; and
perform PIM cancellation on the digital received signal based on the cancellation signal, wherein the digital received signal is generated based on an analog received signal received by the antenna.

* * * * *